Feb. 14, 1939.　　　　E. A. GLYNN　　　　2,147,339
RECAPPING MOLD
Filed Dec. 23, 1936　　　5 Sheets-Sheet 4
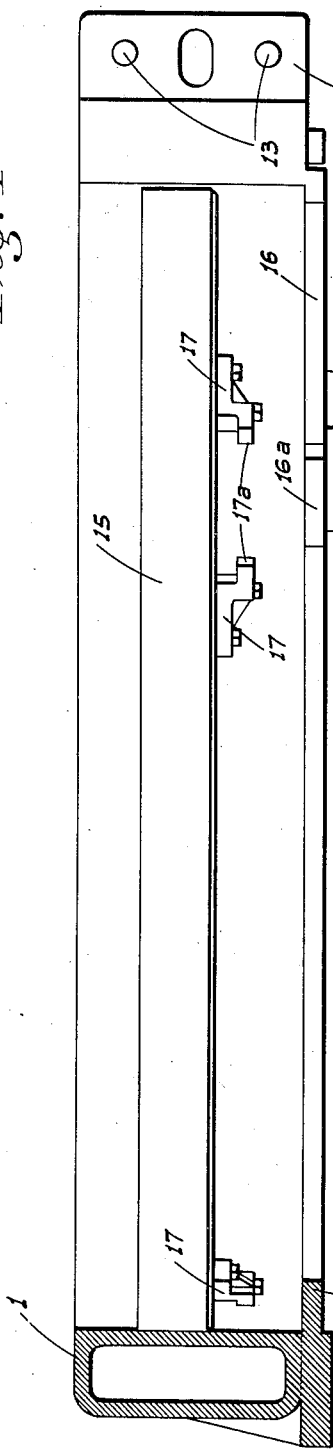
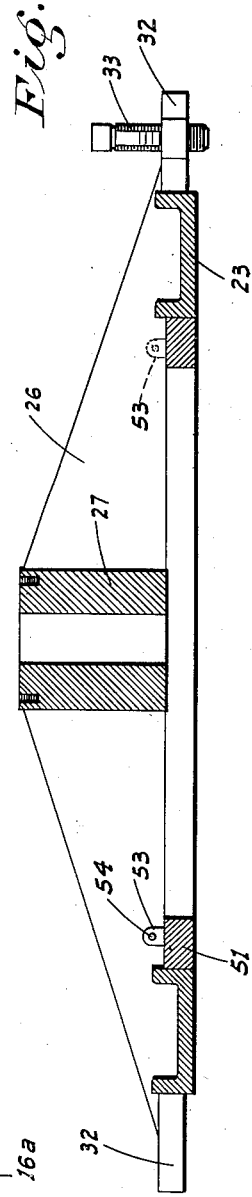
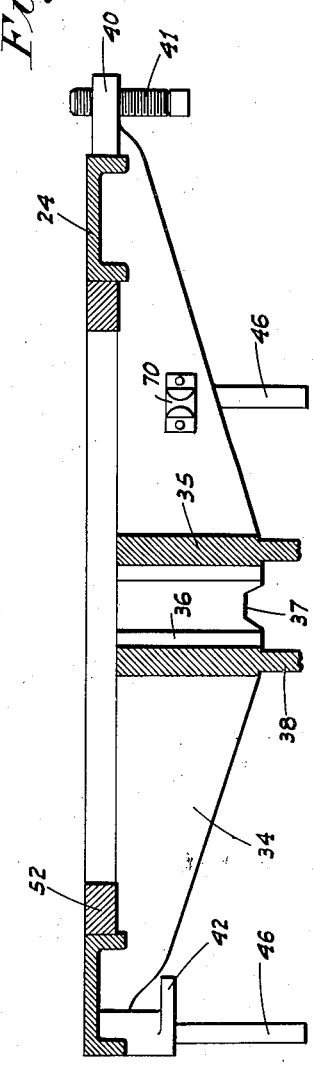
INVENTOR
*E.A.Glynn*
BY
ATTORNEY Feb. 14, 1939.   E. A. GLYNN   2,147,339
RECAPPING MOLD
Filed Dec. 23, 1936   5 Sheets-Sheet 5

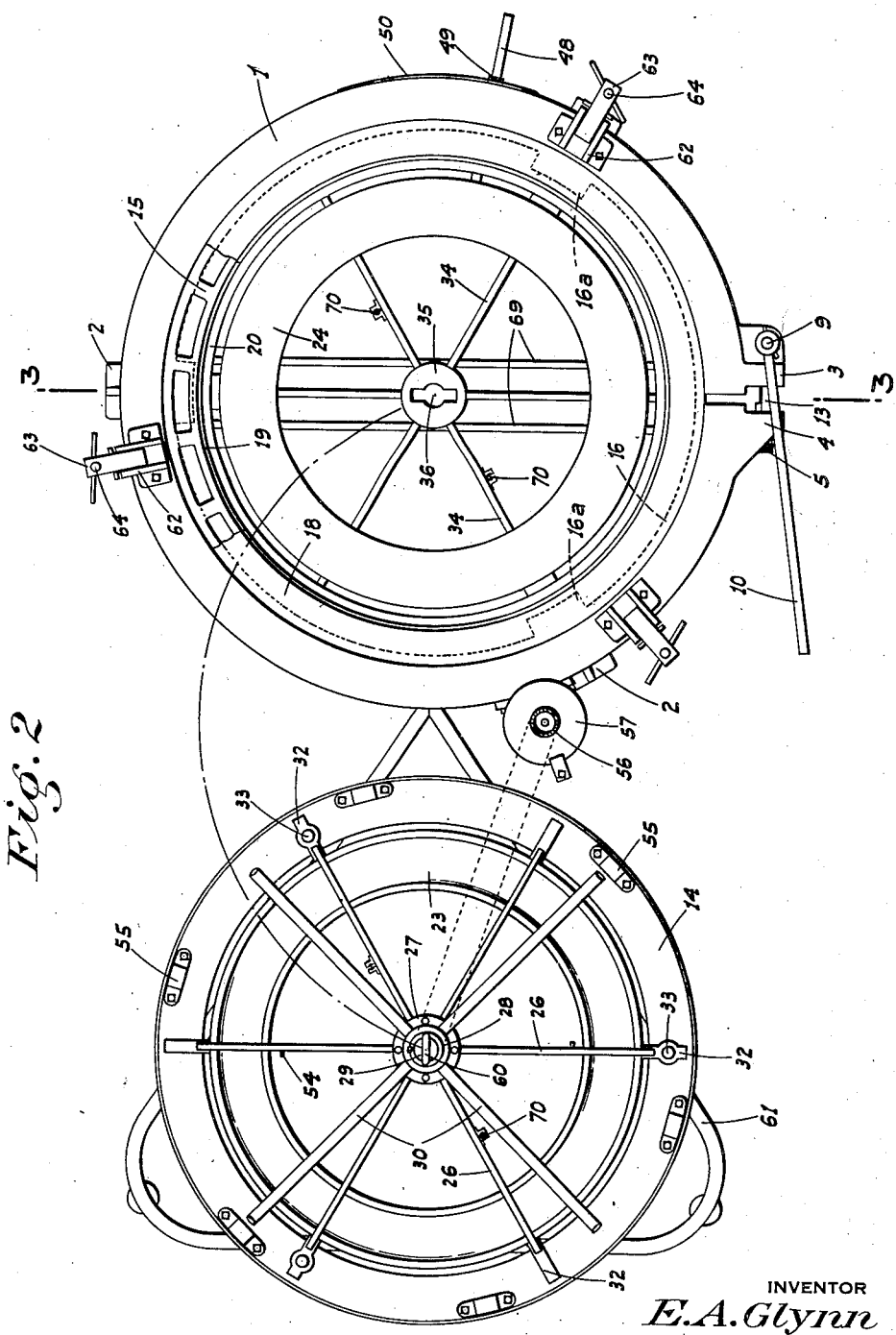

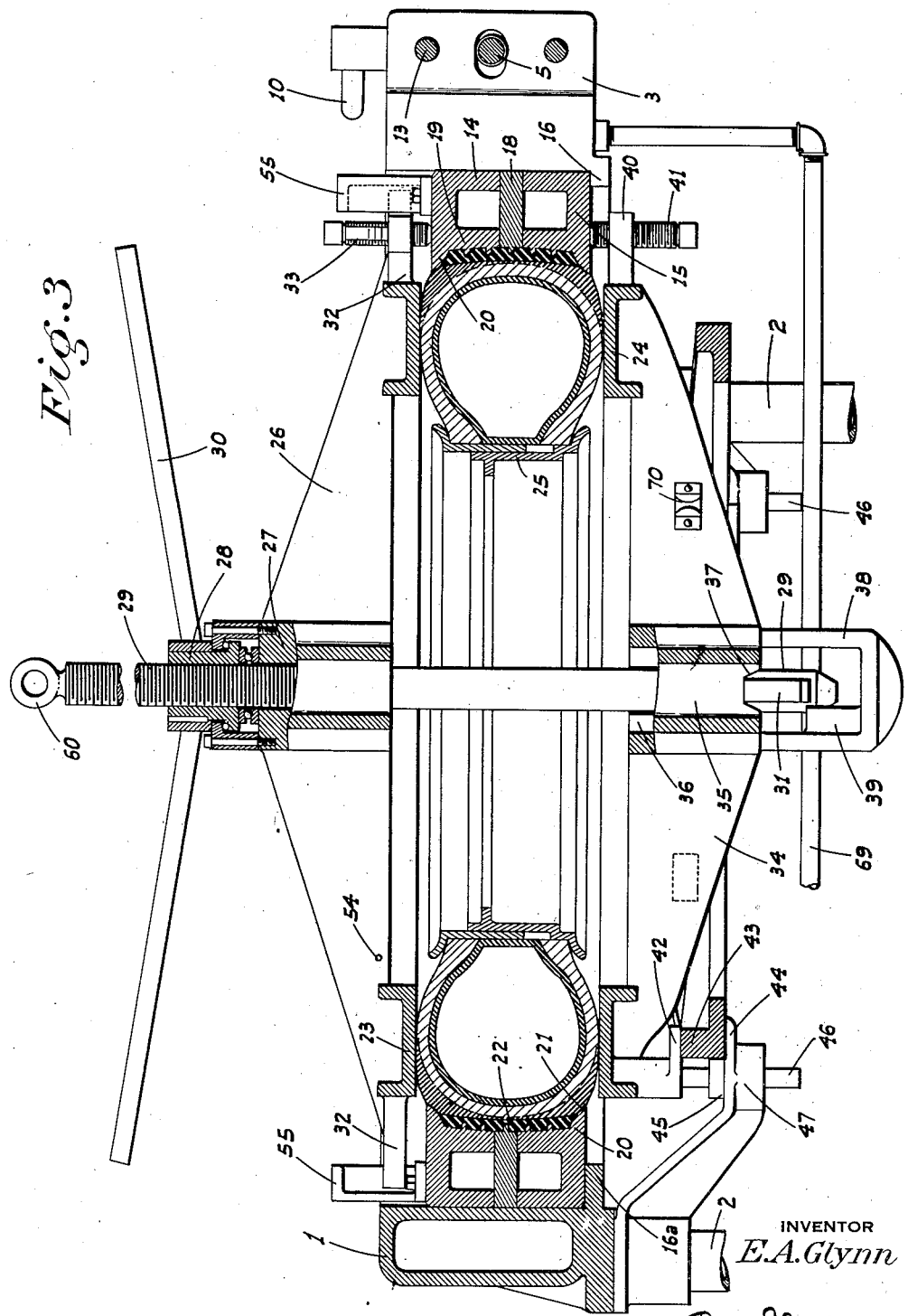

INVENTOR
E. A. Glynn
BY
ATTORNEY

Patented Feb. 14, 1939

2,147,339

UNITED STATES PATENT OFFICE 2,147,339

RECAPPING MOLD

Edwin A. Glynn, Lodi, Calif., assignor to Super Mold Corporation of California

Application December 23, 1936, Serial No. 117,304

12 Claims. (Cl. 18—18)

This invention relates to tire retreading molds and particularly to one for recapping tires, which is replacing only the road engaging tread rubber thereon, as distinguished from molds for the complete replacing of all the rubber on the tires.

The principal object of the invention is to provide a mold of this character having a one-piece steam chamber which eliminates the need of any hinge or swivel joints, hose connections or the like in the steam pipes and which provides for a large steam capacity together with a very even heat distribution.

A further object is to provide a mold which by reason of this one-piece steam chamber utilizes a novel means for securing the matrices in place and which permits of quick insertion and removal of the tire as well as a rapid interchanging of the matrices when necessary.

A further object is to provide a mold in which the pressure plates are so associated with the matrices as to properly cooperate therewith while at the same time one plate is removable as a unit with the corresponding matrix when the tire is to be inserted or removed. Another object is to construct the matrices so that they conform to the original shape of the worn tire so that when the tire is capped it goes back into service retaining its normal shape. The matrices are also provided with short skirts engaging the tire from the sides and arranged to exert lateral pressure on the sides of the recap rubber and the adjacent portions of the sides of the tire.

An additional object is to provide as a unit with the mold a hoist to facilitate insertion and removal of the upper matrix and pressure plate, as well as a tire, into position in the mold.

The mold as a whole is of simple construction which insures trouble free operation, long life, economical maintenance and permanent satisfaction.

These objects I accomplish by means of such structure and relative arrangement of parts as will fully appear by a perusal of the following specification and claims.

In the drawings similar characters of reference indicate corresponding parts in the several views:

Figure 2 is a top plan view showing the upper matrix and pressure plate removed from the mold and disposed to one side of the same, and with the upper portion of the hoist cut off.

Figure 3 is a sectional elevation of the mold with a tire in place therein taken on the line 3—3 of Fig. 2.

Figure 4 is a sectional elevation of the steam chamber detached showing the upper matrix as being lowered to position therein.

Figure 5 is a sectional elevation of the upper pressure plate detached.

Figure 6 is a similar view of the lower pressure plate.

Figure 1:
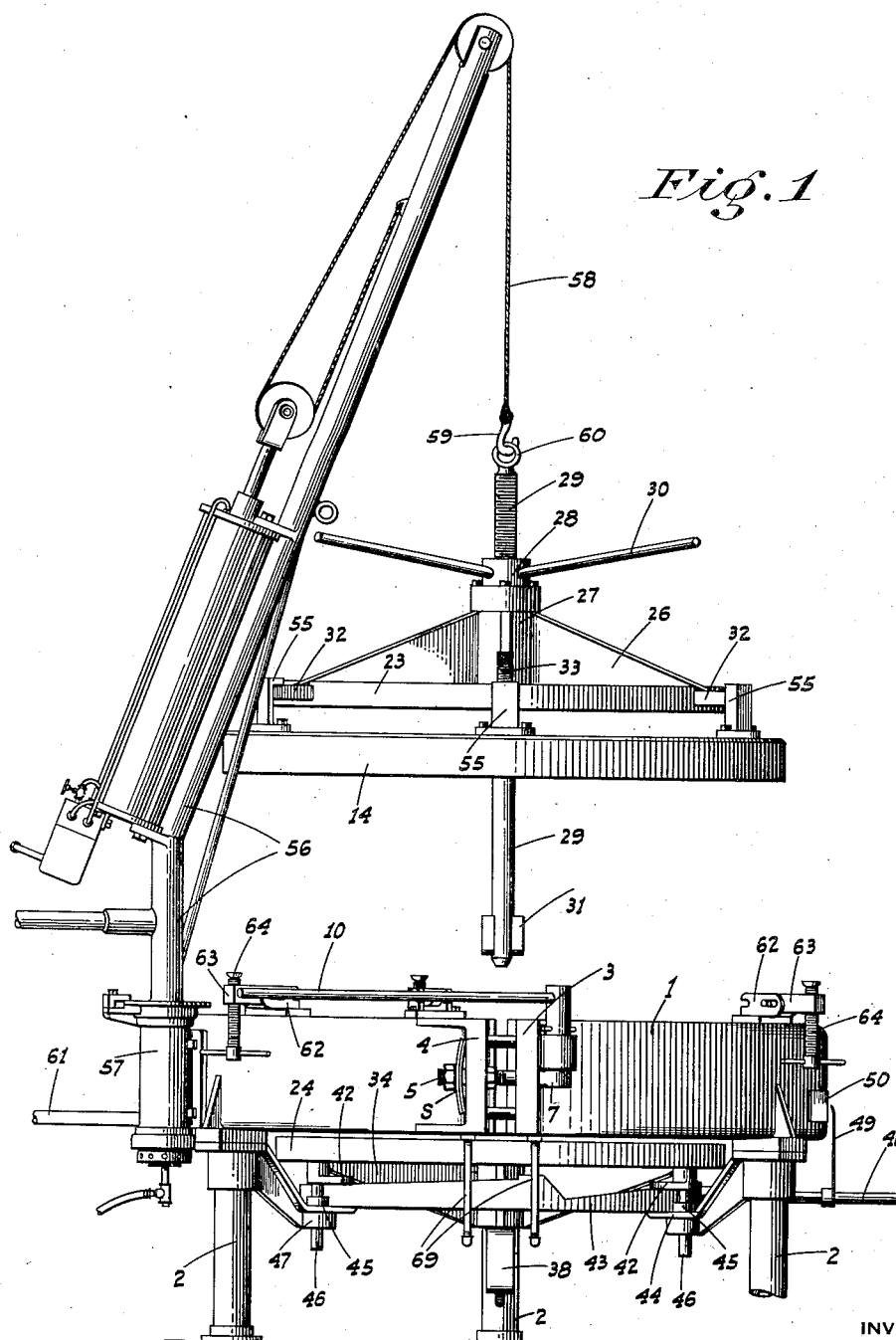
Figure 1 is a side elevation of the complete apparatus showing the upper matrix and pressure plate unit hoisted out of the steam chamber of the mold.
Figure 7:
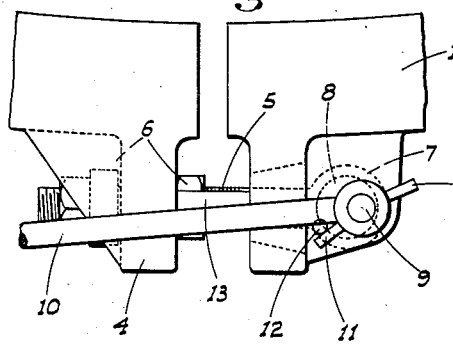
Figures 7 and 8 are top plans of the closing unit for the steam chamber, showing the same in open and closed positions respectively.
Figure 8:
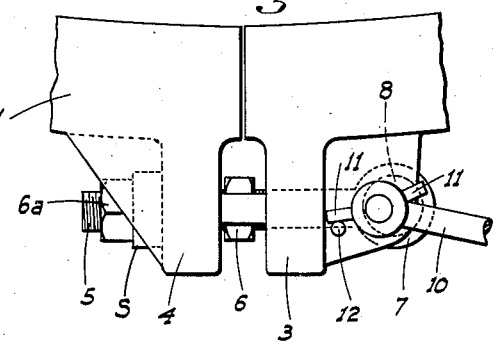
Figure 9:
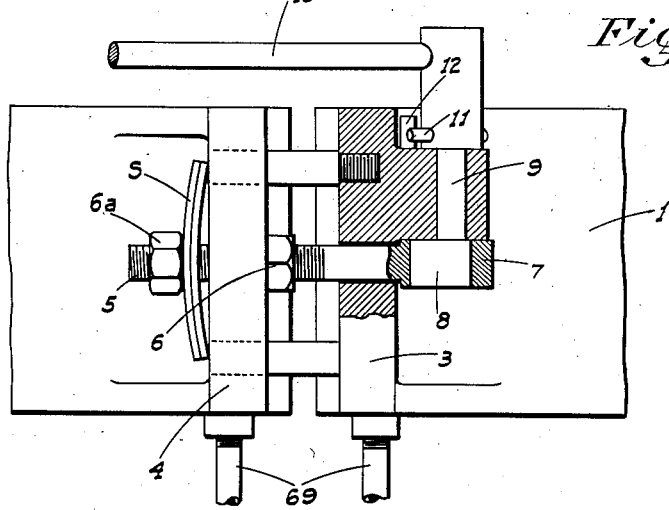
Figure 9 is a front view of the same partly in section.

Referring now more particularly to the characters of reference on the drawings, the mold comprises a radially split ring-like one-piece body forming a steam chamber, which while a casting is to a certain extent resilient. The steam passage is continuous about the body or chamber, except at the split where it is of course closed. The body is disposed horizontal or with its axis vertical and is supported on legs 2 disposed some distance to the sides of the splits and arranged to have a certain amount of movement in a horizontal direction.

The ends of the body or chamber at the split are radially disposed and normally spaced apart somewhat, and are arranged to be brought together so as to contract the body and reduce the diameter of the bore thereof by the following structure:

Projecting outwardly from the body adjacent its ends are ears 3 and 4 through which a bolt 5 freely projects. Adjustable nuts 6 and 6a are disposed on the bolt on opposite sides of the ear 4, and on the outer side of the ear 3 the bolt is provided with an eccentric strap 7. An eccentric 8 turns in this strap and is mounted on the lower end of a shaft 9 journaled in connection with the ear 3. A radial handle bar 10 is applied to this shaft above the body 1 to turn the shaft, the rotation of which is limited to slightly more than 180° by radial stop pins 11 mounted with the shaft and adapted to alternately engage the fixed stop 12. Guide pins 13 are mounted in the ear 3 above and below the bolt 5 and slidably project through the ear 4.

Rotation of the shaft 9 in one direction or the other thus closes or allows the split or gap to open as will be evident; the body tending to expand in the manner of a piston ring. When the gap is closed the bore of the body, which is straight and machined from top to bottom, is a true circle.

Adapted to removably fit in the bore of the body from above are the upper and lower complementary matrix sections 14 and 15. These are complete unbroken rings, machined on the outside and of a diameter to fit freely in the body when the same is expanded, but to be tightly clamped therein when the body is contracted.

These sections are intended to be brought to approximately the proper operating heat (from 300° F. up) before being placed in the body and engaged with a tire. The outer nut 6a is preadjusted to clamp the matrix sections in place when they have expanded due to such heat. However, if the operating heat (and consequently the expansion of the matrix sections) is increased as is sometimes done, the unyielding nut 6a would cause the matrix sections to warp or buckle, since the expansion of the aluminum matrices is greater than that of the cast iron body, and the latter would not expand to the same extent as the matrices with this additional heat. I therefore dispose a heavy compression spring S, preferably of the convex leaf type, between the nut 6a and the adjacent ear 4. The tension of this spring is set, by adjustment of the nut, to resist pressures caused by expansion of the matrices up to 300° F. or thereabout. However, if the heat of the matrices increases to any material degree after the body has been clamped about the same, the spring will yield so as to allow of the corresponding additional expansion of the matrices without danger of them buckling.

The lower matrix is supported at the bottom of the body by a flange 16 extending inwardly from the bore of the body. At even intervals (preferably at the legs) the flange is formed with inwardly projecting straight-edged ledges 16a (see Figs. 2 and 4). Secured on and depending from the lower matrix at intervals corresponding to the spacing of the ledges are lugs 17, (see Fig. 4) disposed inwardly of the flange 16 but in the path of the ledges, and having projecting lips 17a at one end adapted to engage under said ledges. The matrix is of course lowered into position with the lugs clear of the ledges, and upon then rotating said matrix in the proper direction, the lips will pass under the ledges and releasably hold the matrix against upward movement. The upper matrix section when in place rests directly on the lower matrix or on a spacer ring 18 disposed therebetween (see Fig. 3) depending on the size of the tire being worked on.

The matrix sections are formed on the interior with any desired tread design 19, and at their outer opposite edges with short skirts 20 the outer corners of which engage the original side rubber of the tire 21 some distance inwardly of the line of junction of the new and old rubber, as set forth in copending application, Serial No. 145,237, filed May 28, 1937. The skirts are convexly curved on their inner faces so as to engage said rubber with an easy curve. This will cause the new tread rubber 22 with which the tire is being recapped, to merge into the original rubber without any abrupt corners which cause a "hinge" action when the tire is flexed in service and which frequently result in the new rubber pulling away from the old.

Associated with the upper and lower matrix sections are upper and lower pressure plates 23 and 24 respectively. These are bands which are relatively wide in a horizontal plane, adapted to engage the sides of the tire between the matrices and the rim 25 on which the tire is mounted. Incidentally the rim used is of an adjustable type, preferably that shown in the copending application for patent, Serial No. 39,690, filed September 9, 1935, of H. J. Woock.

The upper plate is mounted in unitary connection with a supporting spider which comprises spokes 26 and an upstanding hub 27. Turnably mounted on ball bearings on top of the hub is a sleeve 28 which is threaded on a screw shaft 29; said sleeve having radially extending handles 30 whereby to rotate the shaft. The shaft has a T head 31 on its lower end for the purpose soon to be seen.

In the structure shown, the handle-hub is mounted so that the upper pressure plate 23 is supported from said hub, and is lowered or raised with the advancing or retractive rotation of the hub.

Fingers 32 project radially from the plate 23 at evenly spaced intervals to overhang the upper matrix section; certain ones of the fingers having vertical hand screws 33 adjustably threaded therethrough to engage said matrix, the screws having graduation marks down one side as shown in Fig. 3. Adjusting the screws therefore obviously adjusts the height of the upper pressure plate relative to the upper matrix, and the screws being readily accessible and visible to the operator are easily adjusted.

The lower pressure plate is also mounted on a spider having spokes 34 and a central hub 35. This hub is provided with a slot 36 shaped to receive the shaft 29 and T head 31 therethrough; the bottom of the hub having a notch 37 disposed crosswise of the slot to engage the T head at the top. An open extension 38 depends from the hub to a depth greater than the height of the head 31 and supports a lug 39 to engage the head and limit the rotation of the same to 90°. Fingers 40 project radially from the lower pressure plate to overhang the adjacent matrix, and certain ones of said fingers carry adjustable screws 41 to engage the bottom of the matrix.

These screws however cannot be practicably used as a means to adjust the lower pressure plate to correspond to the position of the upper plate on account of these screws being under the mold and while readily accessible to the hand cannot be easily seen and if graduated it would be hard to set them to any particular position. Also the lower pressure plate being below the lower matrix cannot be practicably supported from the same.

I therefore provide for the support and axial or vertical adjustment of the lower pressure plate from a point where the extent of adjustment can be readily seen by the following means: Spaced horizontal lugs 42 are formed with and below the pressure plate outwardly of the spider thereof and rest on a cam ring 43 disposed concentric with the body 1. This ring is supported on ledges 44 mounted in rigid connection with the body 1 or its legs, and is held centered by rollers 45 engaging the outer surface of the ring and also resting on said ledges. These rollers are mounted on vertical stems 46 fixed in and depending from the lower pressure plate and slidable through bosses 47 formed with and below the ledges 44, so that the pressure plate can move vertically but cannot rotate.

The upper surface of the cam ring is provided with as many circumferentially extending sloping portions or cam surfaces of equal extent, as there are lugs 42, so that rotation of the ring will act on all the lugs with equal effect simultaneously, to raise or lower the pressure plate 24 evenly.

The cam ring is rotated to effect such adjustment of the pressure plate, by means of a handle 48 connected thereto and projecting under the body 1 to a termination beyond the outside of the same. This handle carries an upwardly extending pointer 49 which reads against a plate 50 secured on the outside of the body 1 and graduated circumferentially thereof. The graduations on this plate are proportioned to those on the screws 33, so that turning of said screws until a certain graduation alines with the top of the fingers 32, and moving the handle 48 until the pointer reads against a corresponding graduation on the plate, will place both pressure plates the same distance from the corresponding matrices. The position of the pressure plates relative to the matrices differs for tires of different size and the proper position of said plates is preferably predetermined and printed in chart form; the chart having numbers which correspond to the numbers or symbols marked on the screws and plate 50 adjacent the graduations.

The width of the pressure plates is sufficient to take care of all tires ranging between a certain number of rim sizes. For use with tires having smaller rims, I provide pressure plate extensions in the form of bands 51 and 52 for the upper and lower pressure plates respectively. The upper band 51 is of course flush with the plate 23, the spokes 26 of the upper spider terminating on a level sufficiently above the bottom of the plate to receive the band as shown in Fig. 5. To hold the band in place it is provided with opposed upstanding ears 53 adapted to removably engage pins 54 projecting laterally from opposed spokes. The lower band 52 however does not need any holding means since it rests directly on the spokes of the lower plate 24 as shown in Fig. 6.

In order to insert or remove the tire the upper pressure plate and matrix section are withdrawn upwardly and out of the body. These parts though separate from each other are preferably handled as a unit by the following means:

Secured on and projecting upwardly from the upper matrix 14 are hanger brackets 55, spaced the same as the fingers 32 and having overhanging top flanges adapted to receive the fingers thereunder as shown. These brackets are of sufficient height to thus receive the fingers regardless of any adjusted position of the upper pressure plate. Regardless of such adjustment therefore after a certain amount of upward movement of the said pressure plate, the fingers 32 will engage the bracket flanges and the upper matrix will then be lifted also. This lifting is effected by means of a manually controlled power hoist comprising a boom 56 turnably mounted on a standard 57 secured on one side of the body 1. A hydraulically actuated hoist cable 58 depends from the top of the boom and carries a hook 59 to engage an eye 60 on the upper end of the screw 29. The boom extends at such an angle that the cable may be axially alined with the mold, and when rotated a certain amount from such position it overhangs an auxiliary supporting frame or table 61 disposed to one side of the mold. This table is preferably set some distance from the floor and is of sufficient size to support the upper matrix when the latter is removed from the mold as shown in Fig. 2.

In operation, the body 1 is first opened up, a tire is placed in engaging position with the lower matrix and the lower pressure plate is adjusted by rotation of the cam ring 43; the screws 41 being advanced until they engage the lower matrix so as to maintain the same against upward movement beyond the set position. The upper matrix is then hoisted from the table to a position over the mold and is lowered into place; the screw 29 being positioned so that its head 31 will pass through the slot 36. The cable is then disengaged from the eye 60 and the screws 33 are adjusted to the proper position. Rotation of the screw shaft in the hub 27 by means of the handles 30 to pull the shaft up, after the head 31 has been turned to engage the notch 37, will pull both plates tightly against the corresponding matrices, the limit of such movement being of course determined by the setting of the various adjustment screws.

Figure 10:
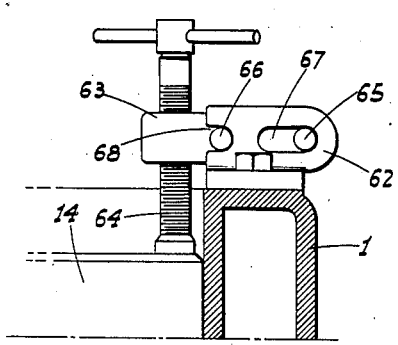
Figure 10 is a side elevation of a matrix clamping bolt unit in its operative position.
Figure 11:
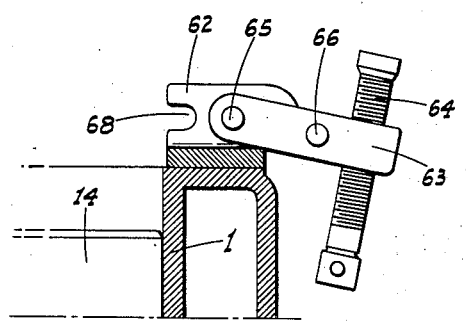
Figure 11 is a sectional elevation of the unit as swung back.

Before this is done however the upper matrix is independently pressed tight against the lower matrix or spacer ring by the following means:

Mounted on top of the body and in evenly spaced relation thereabout are pairs of bracket plates 62, between which is mounted a block 63 extending radially of the body. This block carries a vertically adjustable screw 64 adapted to overhang and engage the upper matrix 14, as shown in Fig. 10. The screws may be swung out of the way of the matrix, each block being mounted in connection with the plates 62 by longitudinally spaced pins 65 and 66, the pin 65 projecting through slots 67 in the plates and the pin 66 being normally engaged in recess 68 in the inner ends of the plates. When the pin 66 is engaged in the plate recess, the pin 65 is at the outer end of the slots 67. In this position the block is held immovable against any pressure exerted by the advancement of the corresponding screw 64, and the matrix 14 engaged by said screw may therefore be tightly pressed down against the tire. When the screw is loosened, however, the block 63 may be slid forward to release the pin 66 from the recess and thus enabling the block to be swung back about the pin 65 as an axis and out of the way of any matrix inserting or removing operations, as shown in Fig. 11.

When the upper matrix has been firmly pressed down by the above screws, the mold body is clamped tightly about the matrices by manipulating the handle 10 and steam may then be circulated through the steam chamber. The steam is thus circulated by means of pipes 69 connected to the underside of the body 1 adjacent the split and of course communicating with the corresponding ends of the steam chamber. These pipes depend a short distance and then extend horizontally under the mold on opposite sides of the member 38 to the boiler or main steam line. This pipe arrangement, in connection of course with the particular type of mold body or steam chamber which requires only a very small amount of movement, avoids the need of any flexible joints or hose in the steam line, ordinary rigid pipe having the necessary resilience to yield with the small opening and closing movement of the body.

When it is desired to remove the tire the screw shaft 29 is lowered until the head 31 clears the notch 37 so that said head may be turned to aline with and pass through the slot 36. This positioning of the head relative to the slot is of course easily effected, since even though said head cannot be readily seen from above it can only turn just so far before it engages the stop lug 39, which has the effect of positioning the head in line with the slot 36. The upper pressure plate and matrix section may then be removed as a unit, said plate moving clear of the tire before the fingers 32 engage the brackets 55 and by such movement tending to cause the tire to be disengaged from the matrix. It sometimes happens however that the tire tends to adhere to one matrix section or the other and it must be broken loose. This may be accomplished by providing conventional chain holders 70 on certain ones of the spokes of the pressure plate spiders, which enable short lengths of chain to be connected to similar holders on the rim on which the tire is mounted. With the lifting of the upper pressure plate therefore, either the tire will be held in place in the lower matrix section, breaking it away from the upper section or it will be held with the upper matrix section, breaking it away from the lower section as the case may be.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirt of the invention, as defined by the appended claims.

Having thus described my invention, what I claim as new and useful and desire to secure by Letters Patent is:

1. A tire retreading mold adapted to receive a tire, a pressure plate disposed inwardly of the mold and adapted to engage one side wall of a tire disposed in the mold, and means to adjust the position of the pressure plate relative to the mold, such means comprising fingers projecting outwardly from the plate and overhanging the mold, and graduated screws adjustably mounted in the fingers and engageable with the mold.

2. A tire retreading mold adapted to receive a tire and including a removable matrix section, a pressure plate disposed inwardly of the mold, means to move the plate axially of the mold, and connections between the plate and matrix section whereby the matrix section may be moved with the movement of the plate, such latter means comprising brackets projecting from the matrix section, and fingers projecting from the plate and engageable with the brackets.

3. A tire retreading mold adapted to receive a tire, a pressure plate disposed inwardly of the mold and adapted to engage one side wall of a tire disposed in the mold, a rotatable member supported outside the plate, means to rotate said member, and means between said member and the plate to move the latter relative to the mold upon rotation of said member.

4. A tire retreading mold adapted to receive a tire, a pressure plate disposed inwardly of the mold and adapted to engage one side wall of a tire disposed in the mold, a rotatable member supported outside the plate, means to rotate said member, and means between said member and the plate to move the latter relative to the mold upon the rotation of said member, and means to hold the plate against rotation.

5. A tire retreading mold adapted to receive a tire, a support for said mold, a pressure plate disposed inwardly of the mold and adapted to engage one side wall of a tire disposed in the mold, a rotatable member supported outside the plate, means to rotate said member, and means between said member and the plate to move the latter relative to the mold upon the rotation of said member, pins projecting from the plate outwardly of said member and bosses projecting from the mold support through which the pins slidably project.

6. A tire retreading mold adapted to receive a tire, a pressure plate disposed inwardly of the mold and adapted to engage one side wall of a tire disposed in the mold, a rotatable member supported outside the plate, means to rotate said member, and means between said member and the plate to move the latter relative to the mold upon rotation of said member, the member rotating means comprising an arm projecting from the member, a pointer on the arm and a graduated plate over which the pointer moves with movement of the arm.

7. A tire retreading mold adapted to receive a tire, a pressure plate disposed inwardly of the mold and adapted to engage one side wall of a tire disposed in the mold, a ring turnably supported from the body of the mold outside the plate, the upper surface of the ring being formed with a cam surface, a lug fixed with the plate and riding the cam surface, and means to rotate the ring.

8. A tire retreading mold adapted to receive a tire, a pressure plate disposed inwardly of the mold and adapted to engage one side wall of a tire disposed in the mold, and removable means applied to the plate to increase the width of that surface thereof which is engageable with the side wall of the tire.

9. A tire retreading mold adapted to receive a tire, a ring-like main pressure plate disposed inwardly of the mold and adapted to engage one side wall of a tire disposed in the mold, an auxiliary pressure plate ring adapted to be fitted closely within the inner periphery of the main pressure plate, and means to removably position said auxiliary ring within the main plate and with the inner surfaces of the two lying in the same plane.

10. In combination, annularly arranged rigid matrix means, and heating and supporting means surrounding said matrix means, said heating and supporting means including a one-piece resilient ringlike body provided with an internal chamber to receive a heating medium, said body being split transversely at one point and having normally spaced closed free ends whereby the ring may be brought into compressive engagement with the matrix means upon movement of the ends toward each other, and means to move said ends toward each other.

11. In combination, annularly arranged rigid matrix means, and heating and supporting means surrounding said matrix means, said heating and supporting means including a one-piece resilient ringlike body provided with an internal chamber to receive a heating medium, said body being split transversely at one point and having normally spaced closed free ends whereby the ring may be brought into compressive engagement with the matrix means upon movement of the ends toward each other, and means to move said ends toward each other, said last means including a resilient element adapted to yieldably resist movement of the ends apart upon circumferential expansion of the matrix means.

12. In combination, annularly arranged rigid matrix means, and heating and supporting means surrounding said matrix means, said heating and supporting means including a one-piece resilient ringlike body provided with an internal chamber to receive a heating medium, said body being split transversely at one point and having normally spaced closed free ends whereby the ring may be brought into compressive engagement with the matrix means upon movement of the ends toward each other, ears rigid with the body adjacent its free end, a bolt slidable through the ears, a nut on the bolt adjacent one ear, a compression spring between the nut and adjacent ear, and means on the bolt engageable with the opposite ear to draw the ears together.

EDWIN A. GLYNN.